United States Patent
Elmasry et al.

(10) Patent No.: US 11,438,969 B2
(45) Date of Patent: Sep. 6, 2022

(54) SYSTEM AND METHOD FOR ADAPTIVE EXTENSION OF COMMAND AND CONTROL (C2) BACKHAUL NETWORK FOR UNMANNED AIRCRAFT SYSTEMS (UAS)

(71) Applicant: Rockwell Collins, Inc., Cedar Rapids, IA (US)

(72) Inventors: George F Elmasry, San Marcos, CA (US); Boe A. Svatek, Cedar Rapids, IA (US); Nicholas Liberko, Marion, IA (US); Daniel Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/018,019

(22) Filed: Sep. 11, 2020

(65) Prior Publication Data
US 2022/0086956 A1   Mar. 17, 2022

(51) Int. Cl.
| | |
|---|---|
| H04W 88/14 | (2009.01) |
| H04W 28/02 | (2009.01) |
| B64C 39/02 | (2006.01) |

(52) U.S. Cl.
CPC .......... H04W 88/14 (2013.01); B64C 39/024 (2013.01); H04W 28/0236 (2013.01); H04W 28/0268 (2013.01)

(58) Field of Classification Search
CPC ......... H04W 28/0236; H04W 28/0268; H04W 88/14; B64C 39/024; B64C 2201/14
See application file for complete search history.

(56) References Cited

U.S. PATENT DOCUMENTS

| | | |
|---|---|---|
| 5,123,112 A | 6/1992 | Choate |
| 5,212,804 A | 5/1993 | Choate |

(Continued)

FOREIGN PATENT DOCUMENTS

| | | | |
|---|---|---|---|
| CN | 103209037 B | 4/2015 | |
| CN | 108349589 A | * 7/2018 | ........... B64C 39/024 |

(Continued)

OTHER PUBLICATIONS https://newjerseywireless.org/feed-rss/ericsson-calls-out-dynamic-spectrum-sharing-as-key-to-nationwide-5g-coverage/, "Ericsson calls out dynamic spectrum sharing as key to nationwide 5G coverage", Ericsson, First Printed Aug. 5, 2020, 5 pages.

(Continued)

*Primary Examiner* — Mehmood B. Khan
(74) *Attorney, Agent, or Firm* — Suiter Swantz pc llo

(57) ABSTRACT

A system and method for adaptive extension of a command and control (C2) backhaul network for unmanned aircraft systems (UAS) is disclosed. In embodiments, the adaptive extension includes front-end and back-end cognitive engines on either side of an extension of the C2 backhaul network to a remote control station otherwise without a point of presence (PoP). Both cognitive engines transmit test packets to the other to refine coding schemes for transmission of C2 packets across the extension based on received feedback about the transmission. When C2 packets are received from the backhaul network or remote control station, the cognitive engines select an optimal coding scheme based on packet size. The cognitive engine encodes the C2 packets based on the optimal coding scheme. When C2 packets are received from the other cognitive engine, the applicable coding schemes are identified and the C2 packets decoded accordingly.

14 Claims, 6 Drawing Sheets

(56) References Cited

U.S. PATENT DOCUMENTS

| | | | |
|---|---|---|---|
| 7,979,200 | B2 | 7/2011 | Bay et al. |
| 8,451,751 | B2 | 5/2013 | Challapali et al. |
| 8,494,546 | B2 | 7/2013 | Hu |
| 8,654,771 | B1 | 2/2014 | Singh et al. |
| 8,976,762 | B2 | 3/2015 | Vlantis et al. |
| 9,237,043 | B1 | 1/2016 | Beals et al. |
| 9,277,413 | B2 | 3/2016 | Kathuria et al. |
| 9,285,463 | B1 | 3/2016 | Freeman et al. |
| 9,326,291 | B2 | 4/2016 | Luo et al. |
| 9,648,589 | B2 | 5/2017 | Weaver et al. |
| 9,872,182 | B2 | 1/2018 | Smith et al. |
| 9,986,440 | B2 | 5/2018 | Guvenc |
| 10,264,463 | B2 | 4/2019 | McHenry et al. |
| 10,477,549 | B2 | 11/2019 | Watts |
| 10,645,627 | B2 | 5/2020 | Abdul et al. |
| 10,823,843 | B1 | 11/2020 | Kendra |
| 11,316,718 | B1 * | 4/2022 | Elmasry ............ H04W 28/04 |
| 2006/0104231 | A1 * | 5/2006 | Gidwani ............ H04W 84/00 370/328 |
| 2010/0302359 | A1 * | 12/2010 | Adams ............ H04L 1/0017 375/240.01 |
| 2012/0120892 | A1 | 5/2012 | Freda et al. |
| 2012/0134328 | A1 | 5/2012 | Gauvreau et al. |
| 2015/0080044 | A1 | 3/2015 | McHenry et al. |
| 2017/0055179 | A1 | 2/2017 | Radunovic et al. |
| 2017/0215178 | A1 | 7/2017 | Kim et al. |
| 2017/0215220 | A1 | 7/2017 | Kim et al. |
| 2017/0325221 | A1 | 11/2017 | Jalali |
| 2018/0002012 | A1 * | 1/2018 | McCullough ....... B64C 29/0033 |
| 2018/0002013 | A1 * | 1/2018 | McCullough ......... B64C 39/024 |
| 2018/0160433 | A1 | 6/2018 | Kim et al. |
| 2018/0262289 | A1 | 9/2018 | Li et al. |
| 2019/0054937 | A1 | 2/2019 | Graetz et al. |
| 2019/0230671 | A1 | 7/2019 | Kim et al. |
| 2020/0120458 | A1 | 4/2020 | Aldana et al. |
| 2020/0187013 | A1 | 6/2020 | Mody et al. |
| 2020/0245167 | A1 | 7/2020 | Kleinbeck et al. |
| 2021/0099870 | A1 * | 4/2021 | Moon ............... H04W 48/16 |
| 2022/0124548 | A1 * | 4/2022 | Srivastava ............ H04L 5/14 |

FOREIGN PATENT DOCUMENTS

| | | | |
|---|---|---|---|
| CN | 109889288 A | 6/2019 | |
| CN | 110392350 A | 10/2019 | |
| CN | 110602758 A | 12/2019 | |
| EP | 2837223 A4 | 1/2016 | |
| GB | 2461724 B | 2/2011 | |
| KR | 1020150095008 A | 8/2015 | |
| KR | 20170105559 A | 9/2017 | |
| KR | 101836480 B1 | 3/2018 | |
| KR | 101949709 B1 | 2/2019 | |
| RU | 2754871 C2 * | 9/2021 | ............ H04L 45/24 |
| WO | 2014094641 A1 | 6/2014 | |
| WO | WO-2022042830 A1 * | 3/2022 | |

OTHER PUBLICATIONS

Lin, Y. et al., "Dynamic Spectrum Interaction of UAV Flight Formation Communication with Priority: A Deep Reinforcement Learning Approach," in IEEE Transactions on Cognitive Communications and Networking, doi: 10.1109/TCCN.2020.2973376, Downloaded Feb. 14, 2020, 12 pages.

U.S. Appl. No. 17/024,266, filed Sep. 17, 2020, entitled System and Method for Generating Control and Non-Payload Communication (CNPC) Congestion Metrics at a Ground Control Station.

U.S. Appl. No. 17/024,279, filed Sep. 17, 2020, entitled System and Method for Same-Channel Out-of-Band Spectrum Sensing for Command and Control (C2) Communications to Unmanned Aircraft Systems (UAS).

U.S. Appl. No. 17/024,309, filed Sep. 17, 2020, entitled System and Method for Spectrum Situational Awareness Via Server-Based Fusion in a Command and Control (C2) Link System for Unmanned Aircraft Systems (UAS).

Cheng Zhixu et al: "Interaction-based Detection Strategy Against Probabilistic SSDF Attack in CSS Network", 2020 IEEE 21st International Workshop on Signal Processing Advances in Wireless Communications (SPAWC), IEEE, May 26, 2020 (May 26, 2020), pp. 1-5, XP033803736, DOI: 10.1109/SPAWC48557.2020.9153883 [retrieved on Jul. 31, 2020].

Extended Search Report in European Application No. 21196420.0 dated Feb. 16, 2022.

* cited by examiner

SYSTEM AND METHOD FOR ADAPTIVE EXTENSION OF COMMAND AND CONTROL (C2) BACKHAUL NETWORK FOR UNMANNED AIRCRAFT SYSTEMS (UAS)

TECHNICAL FIELD

The subject matter disclosed herein is directed generally to unmanned aircraft system (UAS) traffic management and more particularly to infrastructure for handling command and control (C2) traffic between UAS and ground control facilities.

BACKGROUND

Wireless infrastructure is deployed for connecting Unmanned Aerial Systems (UAS) to ground towers to facilitate the flow of Command and Control (C2) traffic. The waveforms deployed for this UAS C2 infrastructure are point to multi-point waveforms (e.g., control and non-payload communications (CNPC)) where the control towers serve as focal points for the UAS C2 wireless segments. For example, a UAS equipped with CNPC-waveform radio operating within the area of coverage of a control tower can maintain wireless communications to that control tower for both uplink and downlink C2 traffic. A UAS can switch over to a different control tower during its flight, e.g., if it travels into a new coverage area served by the different control tower. UAS flight paths are preplanned, and a given flight plan will show which control towers may be used for wireless access during which segments for the duration of the flight.

A deployed UAS C2 wireless infrastructure requires a ground backhaul network to connect the control towers together, and to connect the control towers to all control station locations where remote pilots control UAS operations. For example, a complete UAS infrastructure has a wireless segment through the UAS C2 waveform and a wired ground networking segment for backhauling UAS C2 traffic between remote control stations and control towers. The combined wireless and wired (e.g., physical) segments provide a complete infrastructure for seamless UAS operations. However, some control towers or control station locations may not have a point of presence (PoP) for the C2 backhaul network. The C2 backhaul network must therefore be extended to these remote locations.

The UAS C2 backhaul network may be extended to remote locations by a variety of means. Not all communications links are suitable for all backhaul network extensions, however; for example, satellite communications (SATCOM) links may involve propagation delay incompatible with quality of service (QoS) requirements of the backhaul network. Similarly, retransmission of C2 traffic may not be a viable option in light of QoS requirements. For example, transport protocols that rely on retransmission of lost packets may not be feasible because of the low delay requirements of some UAS C2 traffic. With respect to a C2 backhaul extension, UAS C2 traffic would go through the wireless segment, the wired backhaul network segment, and the extension segment. Even if retransmission of lost packets can be configured to meet QoS delay requirements with respect to the wireless and backhaul segments only, there is no guarantee that retransmission will meet delay requirements through the additional extension segment. Accordingly, backhaul network extensions should avoid retransmission due to the deleterious effect on end-to-end delay requirements.

SUMMARY

An adaptive extension apparatus for an unmanned aircraft system (UAS) command and control (C2) backhaul network is disclosed. In embodiments, the adaptive extension apparatus includes front-end and back-end cognitive engines on either side of the backhaul network extension, one cognitive engine in communication with the backhaul network itself and the other cognitive engine in communication with the remote control station to which the backhaul network is extended. The front-end and back-end cognitive engines may be connected by a variety of communications links. Each cognitive engine (e.g., the front-end to the back-end and the back-end to the front-end) transmits test or training packets over the network extension to the other cognitive engine, which generates performance feedback for the transmission based on one or more quality of service (QoS) parameters. The performance feedback is sent back to the transmitting cognitive engine, which revises coding schemes and/or media characteristics for transmitting C2 traffic based on what the performance feedback indicates. When C2 messages arrive for transmission across the backhaul network extension (e.g., from the backhaul network or the ground control station) the front-end (or back-end) cognitive engine identifies a data type or packet size of the C2 messages and selects an optimal coding scheme based on the data type of the C2 messages. The front-end cognitive engine encodes the C2 messages according to the selected scheme and transmits the encoded messages across the backhaul network extension to the back-end cognitive engine.

In some embodiments, communications links across the backhaul network extension include wireless links and wired/physical links.

In some embodiments, coding schemes include media characteristics for configuring the C2 messages into over-the-air media frames.

In some embodiments, coding schemes include packet-repetition coding schemes.

In some embodiments, coding schemes include sliding-window coding schemes.

In some embodiments, coding schemes include packet-erasure coding schemes.

In some embodiments, QoS parameters include packet-loss ratio and packet delay.

An adaptive extension apparatus for an unmanned aircraft system (UAS) command and control (C2) backhaul network is also disclosed. In embodiments, the adaptive extension apparatus includes front-end and back-end cognitive engines on either side of the backhaul network extension, one cognitive engine in communication with the backhaul network itself and the other cognitive engine in communication with the remote control station to which the backhaul network is extended. The front-end and back-end cognitive engines may be connected by a variety of communications links. Each cognitive engine receives data packets from the other cognitive engine (e.g., across the backhaul network extension) and determines whether the received packets are test/training packets or actual C2 message traffic. If the received packets are training packets, the cognitive engine measures the performance of the packet transmission according to one or more quality of service (QoS) parameters. The determined performance feedback is sent back across the network extension to the transmitting cognitive engine. If the received packets are C2 message traffic, the cognitive engine identifies the underlying coding scheme used to encode the received packets and decodes the C2 messages accordingly.

In some embodiments, communications links across the backhaul network extension include wireless links and wired/physical links.

In some embodiments, coding schemes include packet-repetition coding schemes.

In some embodiments, coding schemes include sliding-window coding schemes.

In some embodiments, coding schemes include packet-erasure coding schemes.

In some embodiments, QoS parameters include packet-loss ratio and packet delay.

A method for adaptive extension of an unmanned aircraft system (UAS) command and control (C2) backhaul network is also disclosed. In embodiments, the method includes transmitting, via a front-end cognitive engine, test or training data packets to a back-end cognitive engine across a backhaul network extension. The method includes receiving performance feedback about the transmitting from the back-end cognitive engine. The method includes adjusting coding schemes for the transmission of C2 message traffic based on the performance feedback. The method includes receiving C2 messages for transmission across the backhaul network extension. The method includes identifying a data type or packet size associated with the C2 messages. The method includes selecting an optimal coding scheme based on the C2 messages. The method includes encoding the C2 messages into one or more over-the-air message frames based on the selected coding scheme. The method includes transmitting the encoded media frames across the backhaul network extension to the back-end cognitive engine.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
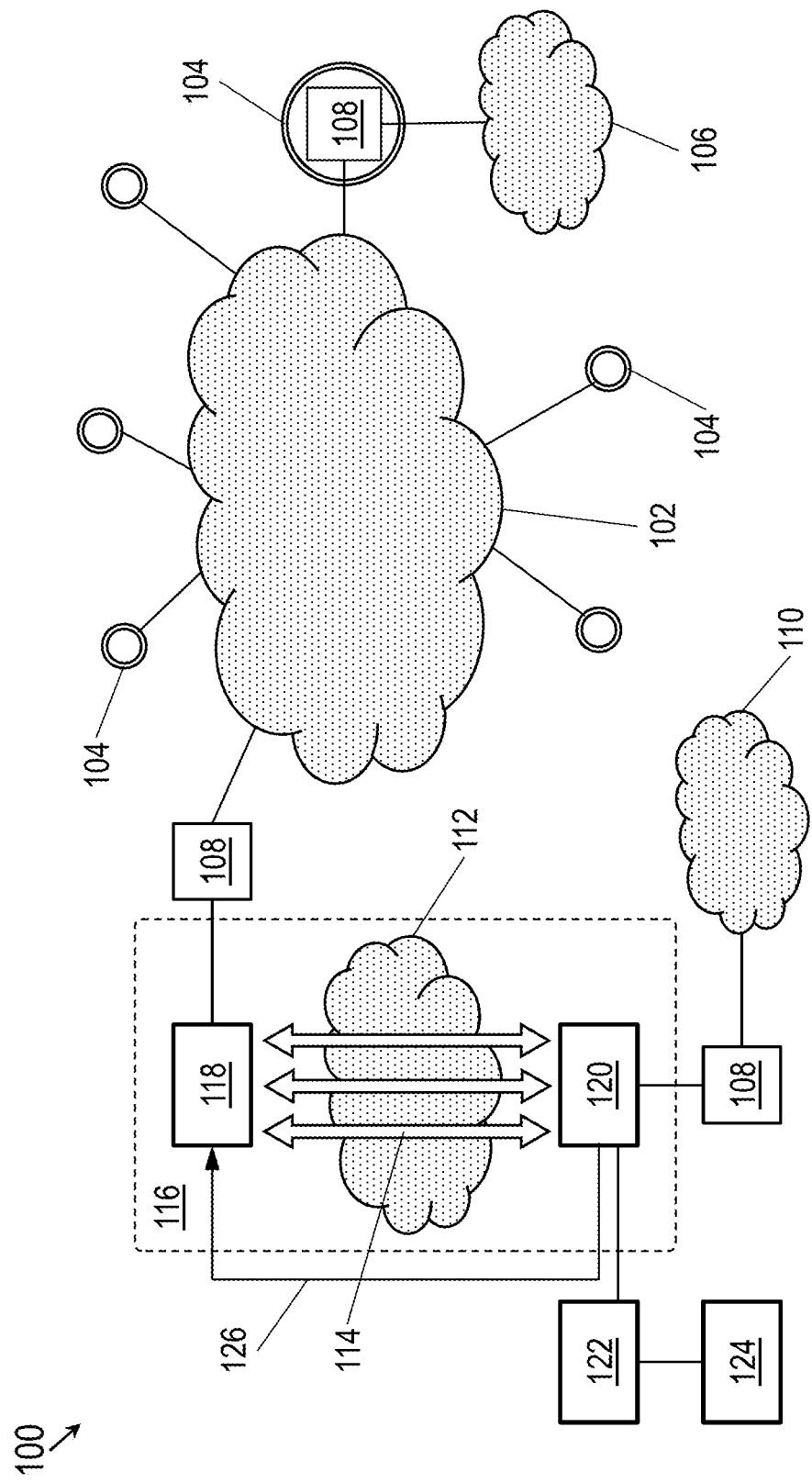
FIG. 1 is a block diagram illustrating an adaptive command and control (C2) backhaul network extension for unmanned aircraft systems (UAS) according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to an apparatus and method for adaptive extension of a command and control (C2) backhaul network for unmanned aircraft systems (UAS) to remote control locations without a point of presence (PoP). The apparatus ensures all C2 traffic meets latency and reliability requirements for UAS operations by adapting network encoding to incoming C2 traffic as it arrives. Adaptive encoding can identify and react to connectivity issues within the network extension, adapting to ensure that C2 traffic flow to the remote control locations meets the necessary quality of service (QoS) without the need for retransmission of C2 messages.

As C2 traffic across the backhaul network extension tends to be relatively low volume, it is possible to trade bandwidth for robustness. The resulting system redundancy ensures reliable transmission across the network extension without the added delay caused by retransmission. For example, larger C2 packets may be fragmented into smaller transmission frames and, through careful coding scheme selection, the probability of losing such a large packet in transmission significantly reduced.

Referring to FIG. 1, a command and control (C2) environment 100 for unmanned aircraft systems (UAS) is disclosed. The C2 environment 100 may include a C2 backhaul network 102 and points of presence 104 (PoP) connecting the C2 backhaul network to C2 enclaves 106.

In embodiments, some C2 enclaves 106 may include one or more control towers forming a wireless local area network (LAN) while other C2 enclaves may include control stations only; still other C2 enclaves may combine LANs and control stations. For example, each control tower may manage C2 traffic to and from UAS operating in its coverage area, while control stations may be associated with remote operators of individual UAS.

In embodiments, each PoP 104 may include a gateway router 108 bridging the C2 backhaul network 102 (e.g., a wide area network (WAN)) and the LANs of the C2 enclave 106. For example, the gateway router 108 may incorporate border gateway protocol (BGP) and other like protocols to separate LAN addresses associated with UAS C2 traffic from WAN addresses associated with the C2 backhaul network 102. Further, the gateway router 108 may establish internet protocol security (IPSec) tunnels through the C2 backhaul network 102 to ensure the security of C2 traffic. Still further, the gateway routers 108 may map type of service (ToS) values from the C2 backhaul network 102 to UAS C2 traffic priority types.

In embodiments, the C2 backhaul network 102 may be configured to meet quality of service (QoS) requirements for UAS C2 traffic. For example, C2 traffic transmitted through the C2 backhaul network 102 may be required to meet particular QoS parameters for latency, delay, or packet loss rates regardless of conditions throughout the network.

In embodiments, the remote C2 enclave 110 may be implemented and may function similarly to the C2 enclave 106, except that the remote C2 enclave 110 may be sufficiently remote from a PoP 104 as to require a backhaul network extension 112. For example, the backhaul network extension 112 may provide one or more diverse means for extending the C2 backhaul network 102 to the remote C2 enclave 110 via a gateway router 108. For example, the remote C2 enclave 110 may include a mobile control station, and the backhaul network extension 112 may incorporate or leverage a public cellular wireless network as a means of extension. Other means of extension may include, but are not limited to, microwave links, public Internet, public cellular provider networks, and other like wired or wireless communication links 114.

In embodiments, the backhaul network extension 112 may incorporate an adaptive extension 116 to ensure that any UAS C2 traffic transmitted across the backhaul network extension meets any applicable QoS requirements. For example, the adaptive extension 116 may include a front-end cognitive engine 118 and a back-end cognitive engine 120 on either end of the backhaul network extension 112. It should be noted that UAS C2 traffic is bidirectional, so the front-end and back-end cognitive engines 118, 120 may create an adaptive closed-loop feedback mechanism for bidirectional traffic, e.g., with respect to C2 traffic inbound to the C2 backhaul network 102 from the remote C2 enclave 110, and vice versa. The front-end and back-end cognitive engines may be implemented as one or more software-based applications configured to execute on one or more processors. In some embodiments, the front-end or back-end cognitive engines 118, 120 may report performance data and dynamic spectrum analysis information to a centralized server 122 for display to, and analysis by, a human in the loop 124 (HITL). For example, based on performance data presented to the HITL 124, the HITL may, through the centralized server 122, provide control input to the front-end or back-end cognitive engines 118, 120, e.g., in order to train the front-end and back-end cognitive engines the best mode of automatic reaction to a particular set of circumstances.

In embodiments, the front-end cognitive engine 118 may, when not actually transmitting C2 traffic across the C2 backhaul extension 112 to the back-end cognitive engine 120, transmit test or training packets to the back-end cognitive engine to learn about optimal network coding strategies and media configurations based on different data types or link conditions associated with the communications links 114. For example, the back-end cognitive engine 120 may receive the transmitted test or training packets, providing the front-end cognitive engine 118 with performance reports (126; e.g., performance feedback) as to the success of the encoding or transmission (e.g., compared to applicable QoS requirements for C2 traffic). Based on this feedback, the front-end cognitive engine 118 may further adapt its stored encoding schemes (e.g., stored to memory or the like) to increase or decrease the degree of error correction redundancy.

In some embodiments, the front-end cognitive engine 118 may respond to a performance report by switching communications links 114, e.g., switching the transmission of encoded data packets or test packets to a new or different communications link through the C2 backhaul extension 112, e.g., a link associated with more favorable media characteristics and/or better performance.

Figure 2:
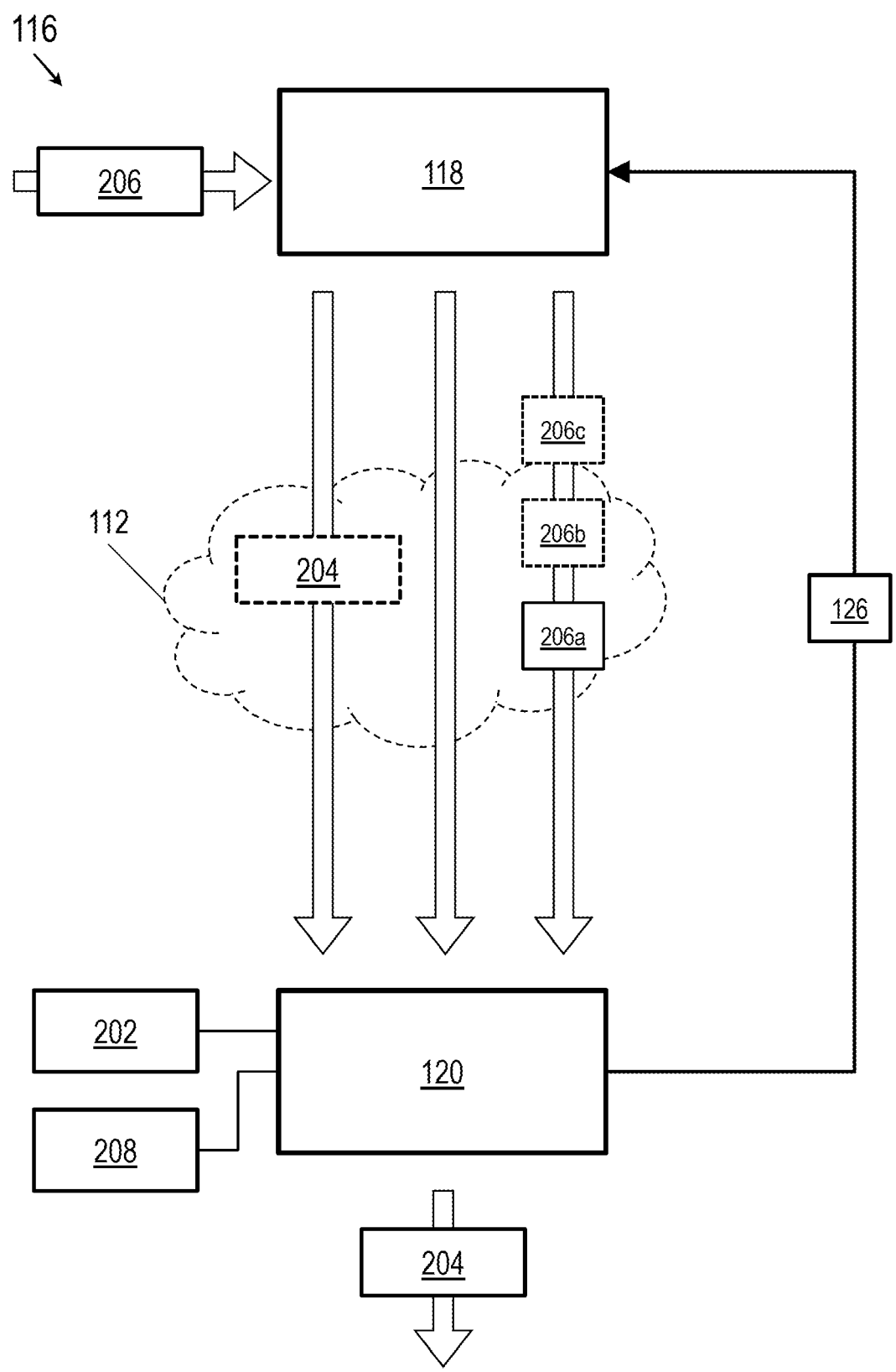
FIG. 2 is a block diagram illustrating operations of the adaptive C2 backhaul network extension of FIG. 1.

Referring now to FIG. 2, the adaptive extension 116 is shown.

In embodiments, the front-end and back-end cognitive engines 118, 120 may be implemented as IP-layer software modules configured to execute on one or more processors. For example, the front-end and back-end cognitive engines 118, 120 may be programmed with, or may have access to (e.g., via memory 202 or other like data storage), configuration parameters and performance metric thresholds (e.g., delay, packet loss) for the C2 backhaul network 102. The back-end cognitive engine 120 may measure the performance of test or training packets 204 transmitted by the front-end cognitive engine 118 across the backhaul network extension 112 against these thresholds in order to provide performance reports 126 to the front-end cognitive engine, which in turn may further adapt network coding schemes for C2 traffic 204a. For example, UAS C2 packet loss requirements may provide for a maximum tolerated packet loss ratio of $10^{-4}$ (e.g., 1 in 10,000) or less. If observed packet loss is higher than $10^{-4}$, the front-end cognitive engine (based on performance reports 126 generated and transmitted across the backhaul network extension 112 by the back-end cognitive engine) may further refine network coding to increase robustness and decrease packet loss. Similarly, if transmission of the test or training packets 204 is associated with delay variation (e.g., jitter) that increases delay above a threshold level, the front-end cognitive engine 118 may adapt network coding to reduce jitter.

In embodiments, the front-end cognitive engine 118 may first attempt to identify an optimum packet size for transmitting UAS C2 traffic 206 (e.g., extension media) across the backhaul network extension 112. For example, UAS C2 traffic/extension media 206 may be associated with a variety of packet sizes and/or media characteristics associated with the configuration of C2 traffic message packets into IP message frames for transmission across the backhaul network extension 112, including, e.g., small messages compatible with a single over-the-air frame and larger messages that may require fragmentation to match the over-the-air frame size. In embodiments, the front-end cognitive engine 118 may first determine the data type (e.g., packet size) of the extension media 206 and select an optimum coding scheme and/or media characteristic based on the identified packet size. For example, if the extension media 206 consists of 3G wireless cellular media, the front-end cognitive engine 118 may optimally map the packet size to a known 3G over-the-air transmission frame size, e.g., matching a single IP packet to a single over-the-air frame. Most extension media types are associated with a voice-over-IP (VoIP) type whereby a single short voice packet is mapped to a single over-the-air frame. In many cases, the front-end cognitive engine 118 may map extension media 206 to its corresponding VoIP type (e.g., 20 bytes of payload to match wireless media VoIP codec G.729), which is generally the most suitable mapping for transmission across the backhaul network extension 112, e.g., as the VoIP type may most effectively compensate for packet loss and may be associated with the least delay. In some embodiments, as described above, a large C2 traffic message 206 (e.g., approaching 1 kB) may be fragmented into much smaller transmission frames, e.g., 50 frames of 20 bytes each.

In embodiments, the front-end cognitive engine 118 may select an optimum coding scheme and/or media frame size (e.g., the frame size and/or coding scheme resulting in minimal delay and/or minimal packet loss) based on the transmission performance of test packets of various sizes as measured by the back-end cognitive engine 120, and as communicated back to the front-end cognitive engine 118 in the form of performance reports 126. To emphasize the importance of optimal packet size, it should be noted that fragmentation of an IP packet into multiple over-the-air frames may increase packet loss ratio, as the loss of a single frame (of N frames, where N is an integer) may result in the loss of the entire IP packet. For example, a C2 message 206 fragmented into 10 over-the-air frames (where over-the-air frame loss ratio is in the range of $10^{-4}$, may result in IP packet loss in the $10^{-3}$ range. Further, fragmentation increases IP packet delay because the receiving end must wait for all the frames of a given IP packet to arrive before reassembling the packet.

In some embodiments, longer C2 messages 206 may be segmented and mapped to erasure coding (e.g., a ~1 kB C2 message may be fragmented into 50 frames of 20 kB each and frames repeated such that 60 or 70 such frames are actually transmitted, decreasing the probability that the loss of any one component frame leads to the loss of the entire C2 message. In some embodiments, shorter C2 messages 206 that arrive at a low rate may be encoded according to packet repetition, e.g., one C2 message may be mapped to one extension packet regardless of the packet size in order to meet QoS latency requirements.

In embodiments, the front-end cognitive engine 118 may map shorter, bursty messages to a packet-concatenation scheme (see, e.g., FIG. 3 below) while short, infrequent messages may be mapped to a packet-repetition scheme. In some embodiments, the front-end cognitive engine 118 may adapt the packet-repetition scheme by repeating one or more frames of an encoded C2 message 206 additional times (206*a-c*). The received C2 packets 206*a-c* may be decoded by the back-end cognitive engine 120 into their component extension media 206 (e.g., after the back-end cognitive engine has identified the coding scheme used) and transmitted to the C2 enclave (110, FIG. 1), e.g., via a gateway router (108, FIG. 1) connecting the adaptive extension 116 and the C2 enclave 110.

In some embodiments, the front-end and back-end cognitive engines may be trained or supplemented by a human in the loop 208 (HITL). For example, performance reports 126 may be transmitted to the HITL 208 via a centralized server for analysis. Based on control input submitted by the HITL 208 through the centralized server, the front-end and back-end cognitive engines 118, 120 may build a larger knowledge base as to which coding schemes and/or media characteristics are best suited to a variety of data types and/or link conditions.

Figure 3:
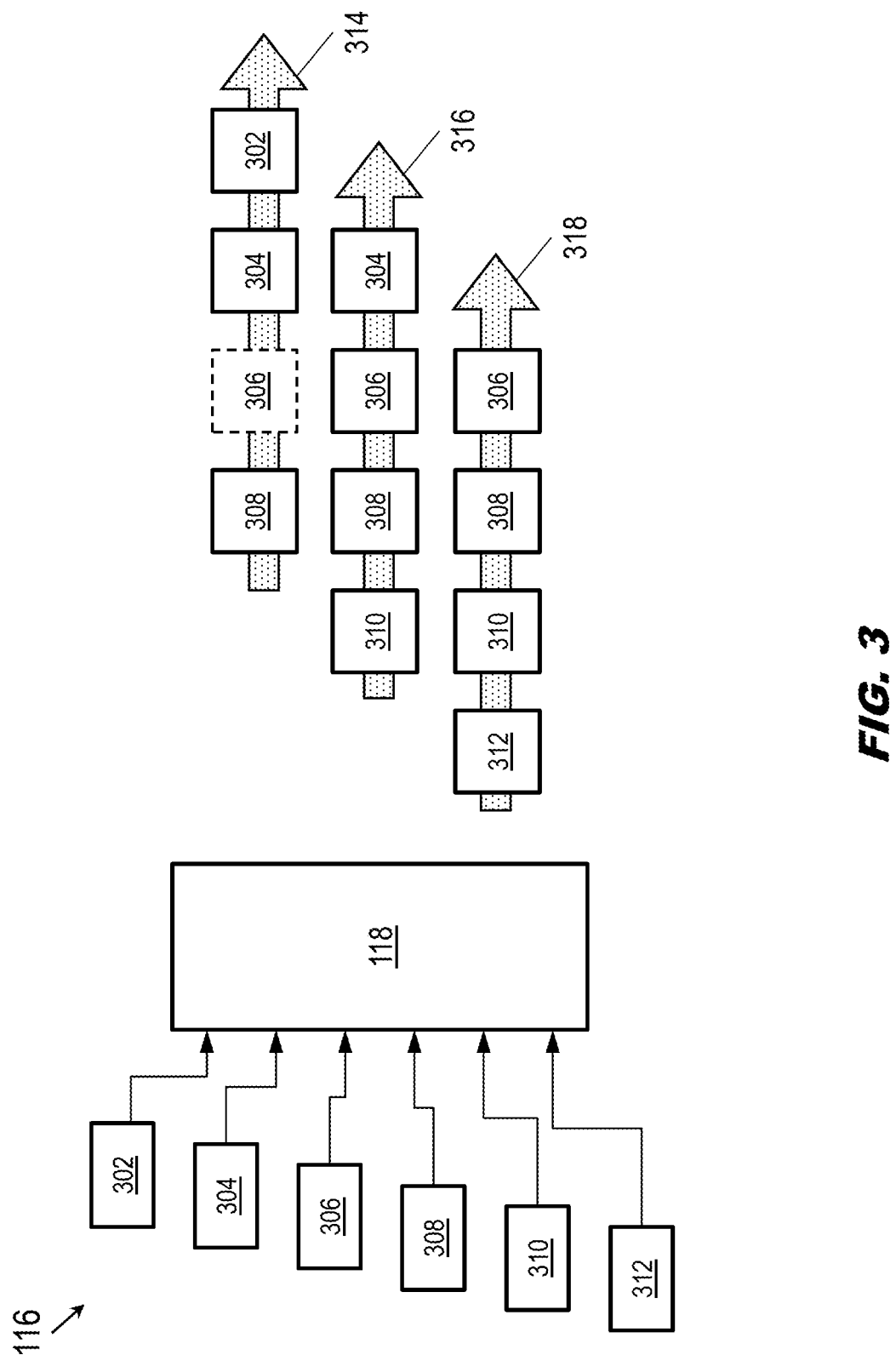
FIG. 3 is a block diagram illustrating coding schemes of the adaptive C2 backhaul network extension of FIG. 1.

Referring to FIG. 3, the adaptive extension 116 is shown.

In embodiments, the front-end cognitive engine 118 may, based on identified media characteristics of extension media (e.g., UAS C2 messages 302-312), concatenate multiple C2 short messages into a large media frame 314. For example, the UAS C2 messages 302-312 may each be small in size, but may arrive at a relatively high rate or in bursts (compare, e.g., the short but non-bursty C2 messages incorporated into repeated C2 packets 206*a-c* above in FIG. 2). For example, the media frame 314 may include the UAS C2 messages 302, 304, 306, and 308. The next media frames 316, 318 transmitted by the front-end cognitive engine 118 may respectively include the UAS C2 messages 304, 306, 308, and 310 and 306, 308, 310, and 312. Accordingly, if the media frame 314 including the UAS C2 message 306 is lost, the UAS C2 message 306 may still be recovered from the media frames 316, 318. For any media frame 314-318 incorporating N UAS C2 messages, N consecutive media frames must be lost for a single UAS C2 message 302-312 to be lost. Further, the sliding-window coding scheme may reduce jitter, as any excessively delayed or out of order media frames 314-318 may be discarded, and their component UAS C2 messages 302-312 recovered by the back-end cognitive engine (120, FIG. 2) from prior media frames already received. As opposed to the large C2 message and small extension media frame sizes discussed above, sliding-window coding may provide a more robust coding scheme for smaller C2 messages 302-312 and a larger media frame 314-318.

In embodiments, the front-end cognitive engine 118 may adapt sliding-window coding by increasing or decreasing the number of UAS C2 messages 302-312 incorporated within each media frame 314-318. For example, highly reliable media may be transmitted via media frames including a single UAS C2 message; similarly, as media reliability decreases the number of UAS C2 messages 302-312 incorporated into each media packet 314-318 may increase. Further, if media reliability is high but subject to fluctuation, and bandwidth is sufficient to allow for larger media frame sizes, sliding-window coding may provide for additional system redundancy at negligible or zero cost.

Figure 4:
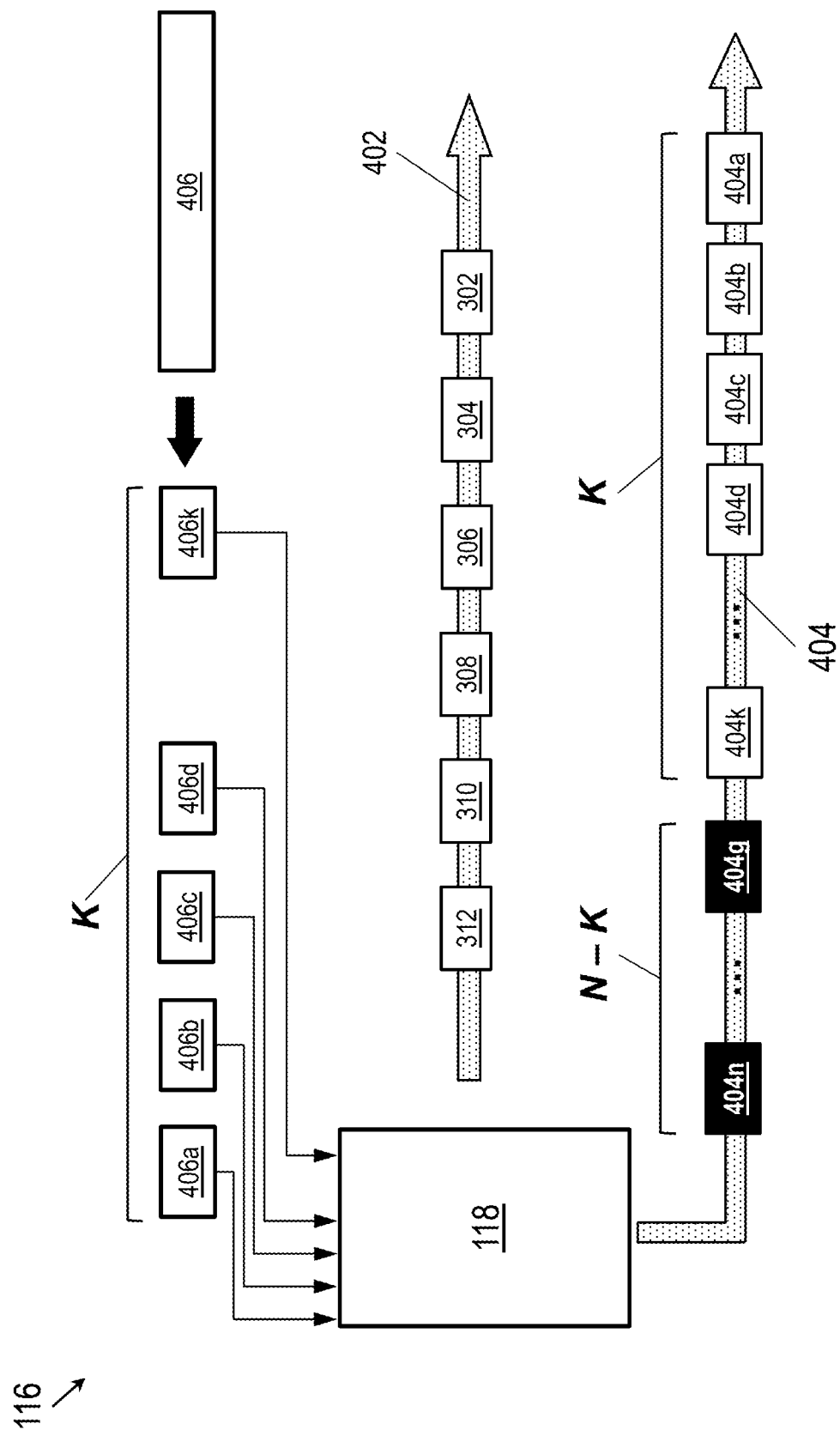
FIG. 4 is a block diagram illustrating coding schemes of the adaptive C2 backhaul network extension of FIG. 1.

Referring to FIG. 4, the adaptive extension 116 is shown.

In embodiments, the adaptive extension 116 may incorporate packet-erasure coding for transmission of media frames 402, 404 across the C2 backhaul network extension (112, FIG. 2). For example, the short burst of C2 messages 302-312 shown above in FIG. 3 may be mapped into a media frame 402 incorporating erasure coding without fragmentation.

In some embodiments, a large C2 message 406 may be received by the front-end cognitive engine 118, which may opt to transmit the C2 message via erasure coding incorporating fragmentation of the large message into K individual packets (e.g., where K is an integer). For example, the large C2 message 406 may be ~1 kB, which the front-end cognitive engine 118 may fragment into 50 packets 406a, 406b, ... 406k of ~20 bytes each.

In embodiments, the front-end cognitive engine 118 may map the K UAS C2 packets 406a, 406b, ... 406k into a media frame (404) incorporating N encoded packets 404a, 404b, ... 404n (e.g., where K<N). For example, the front-end cognitive engine 118 may incorporate low-density parity-check erasure coding or any like applicable erasure coding scheme or schemes.

In embodiments, the N encoded packets 404a-k may include (N−K) redundancy packets 404g-n (e.g., N=70, K=50::N−K=20). Generally, erasure coding may compensate for packet loss to an extent. For example, the back-end cognitive engine (120, FIG. 2) may reconstruct the K UAS C2 packets 406a-k based on any received K of the N transmitted encoded packets 404a-n. Similarly, erasure coding may compensate for jitter as an excessively delayed test packet or a packet received out of sequence may be given up for lost, as its content may be recovered from the redundancy packets 404g-n.

In some embodiments, the front-end cognitive engine 118 may compensate for high packet loss by increasing N and thus N−K, or the number of redundancy packets 404g-n transmitted. Similarly, N−K may be decreased with respect to high media reliability.

Figure 5A:
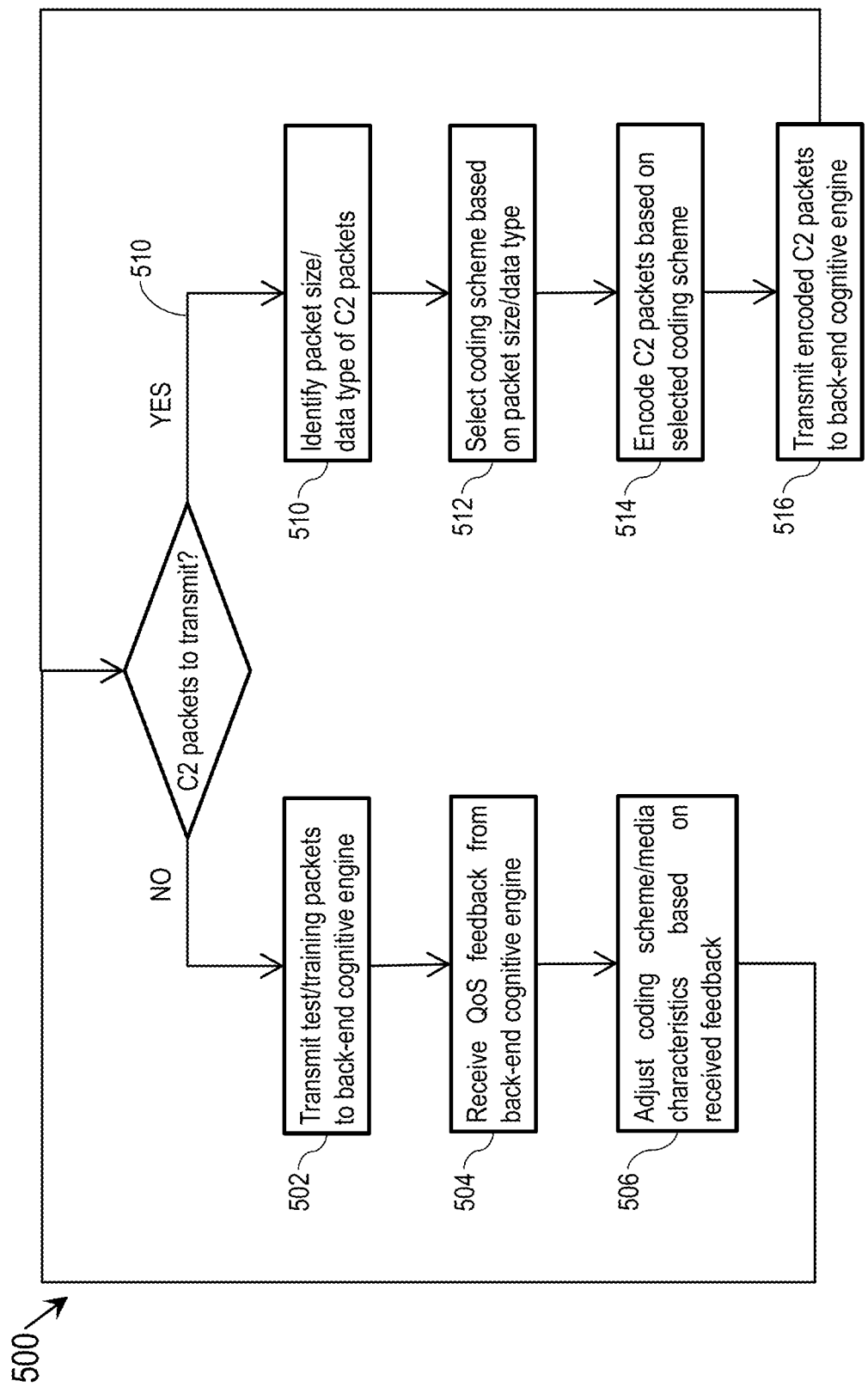
FIGS. 5A and 5B are flow diagrams illustrating a method for adaptive extension of a C2 backhaul network respectively for packet transmission and packet reception according to example embodiments of this disclosure.

FIGS. 5A/B—Method

Referring now to FIG. 5A, the method 500 may be implemented by the adaptive extension 116, and may include the following steps.

At a step 502, if there is currently no C2 traffic to transmit across the backhaul network extension, the front-end cognitive engine generates test or training packets for transmission across the various communications links to the back-end cognitive engine.

At a step 504, the front-end cognitive engine receives performance feedback from the back-end cognitive engine, the feedback indicating the performance of the transmission of the test or training packets against various quality of service (QoS) parameters, e.g., packet loss or delay.

At a step 506, the front-end cognitive engine adjusts its library of coding schemes based on the received performance feedback. For example, the front-end cognitive engine may refine packet sizes or media characteristics corresponding to how a given C2 message to be transmitted is configured into over-the-air media frames.

At a step 508, C2 messages or traffic are received (e.g., from the C2 backhaul network or from a remote ground station) for transmission across the backhaul network extension to the back-end cognitive engine.

At a step 510, the front-end cognitive engine identifies data types and/or packet sizes associated with the received C2 messages.

At a step 512, the front-end cognitive engine selects an optimal coding scheme for transmission based on the identified data type.

At a step 514, the front-end cognitive engine encodes the C2 messages into over-the-air media frames according to the selected coding scheme and/or media characteristics.

At a step 516, the front-end cognitive engine transmits the encoded media frames across the backhaul network extension to the back-end cognitive engine.

Figure 5B:
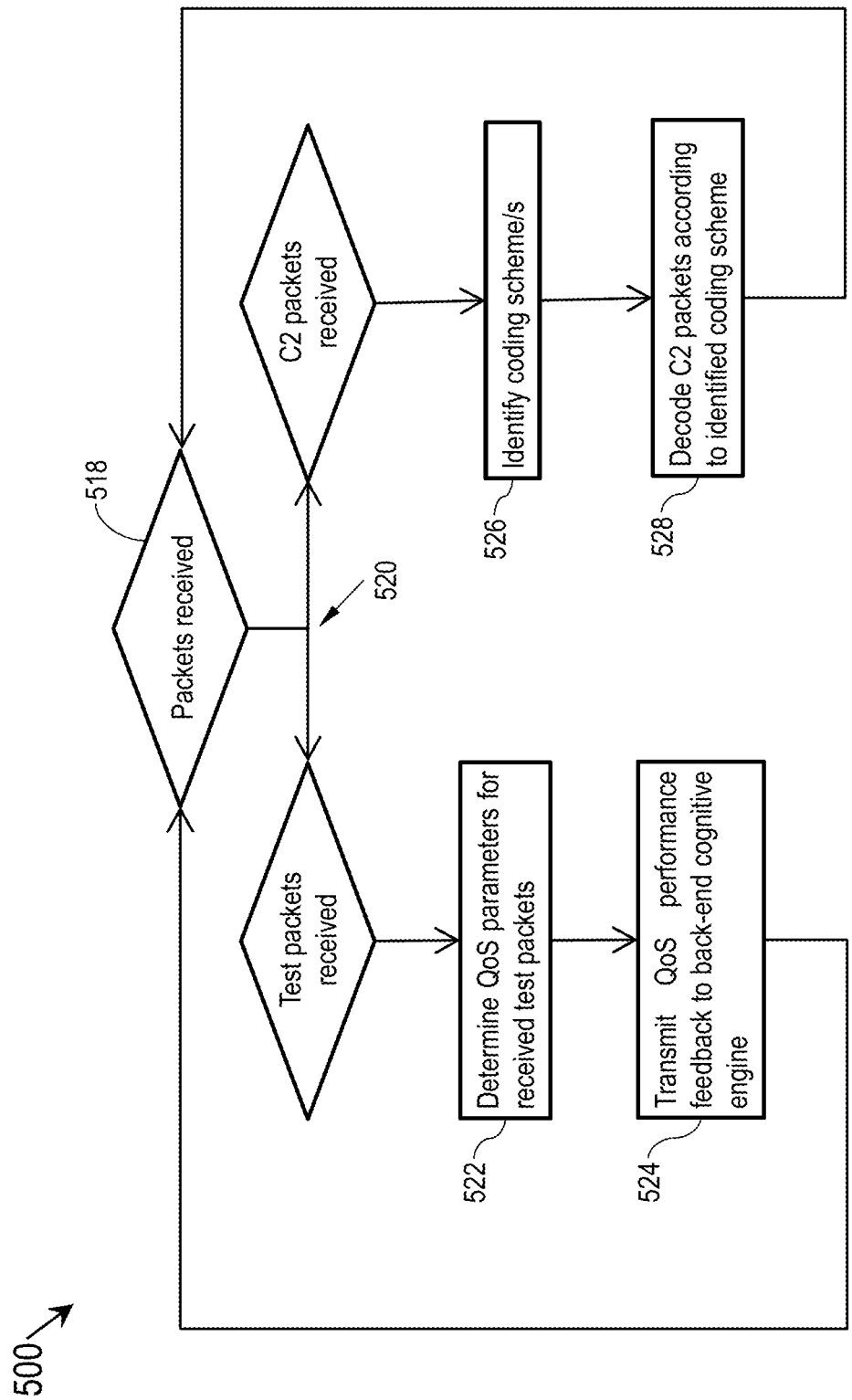

Referring also to FIG. 5B, the method 500 may include additional steps 518 through 528. At the step 518, the front-end cognitive engine receives packets transmitted over the backhaul network extension by the back-end cognitive engine.

At a step 520, the front-end cognitive engine determines if the received packets are test/training packets or C2 packets corresponding to a C2 message.

At a step 522, if the received packets are test/training packets, the front-end cognitive engine determines performance parameters corresponding to the transmission and reception of the test/training packets based on observed packet loss, delay, or other QoS parameters.

At a step 524, the front-end cognitive engine transmits the QoS performance reports to the back-end cognitive engine through the backhaul network extension.

At a step 526, if the received packets are C2 packets or media frames, the front-end cognitive engine identifies the coding scheme or schemes used to encode the C2 packets.

At the step 528, the front-end cognitive engine decodes the received C2 packets according to the identified coding scheme.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An adaptive extension apparatus for an unmanned aircraft system (UAS) command and control (C2) backhaul network, comprising:

at least two cognitive engines including a front-end cognitive engine and a back-end cognitive engine communicatively connected by one or more communications links, the front-end cognitive engine communicatively coupled to one of, and the back-end cognitive engine communicatively coupled to the other of, 1) a UAS C2 backhaul network and 2) a UAS C2 remote ground station not otherwise connected to the UAS C2 backhaul network, the UAS C2 backhaul network associated with one or more quality of service (QoS) parameters;
each cognitive engine configured to:
transmit one or more test packets to the other cognitive engine via the one or more communications links;
receive feedback based on the transmitting from the other cognitive engine via the one or more communications links, the feedback associated with the one or more QoS parameters;
based on the received feedback, adjust one or more of a coding scheme and a media characteristic associated with the transmission of one or more C2 packets via the one or more communications links;
receive the one or more C2 packets from the backhaul network or the remote ground station;
identify at least one packet size associated with the one or more C2 packets;
select at least one coding scheme based on the identified packet size;
encode the one or more C2 packets based on the selected coding scheme; and
transmit the one or more encoded C2 packets to the other cognitive engine via the one or more communications links.

2. The adaptive extension apparatus of claim 1, wherein the one or more communications links include at least one of a wireless link and a physical link.

3. The adaptive extension apparatus of claim 1, wherein the at least one coding scheme includes at least one media characteristic associated with configuring the one or more C2 packets into at least one message frame.

4. The adaptive extension apparatus of claim 1, wherein the at least one coding scheme includes at least one packet repetition coding scheme.

5. The adaptive extension apparatus of claim 1, wherein the at least one coding scheme includes at least one sliding window coding scheme.

6. The adaptive extension apparatus of claim 1, wherein the at least one coding scheme includes at least one packet erasure coding scheme.

7. The adaptive extension apparatus of claim 1, wherein the one or more QoS parameters include at least one of a packet loss ratio and a packet delay.

8. An adaptive extension apparatus for an unmanned aircraft system (UAS) command and control (C2) backhaul network, comprising:
at least two cognitive engines including a front-end cognitive engine and a back-end cognitive engine communicatively connected by one or more communications links, the front-end cognitive engine communicatively coupled to one of, and the back-end cognitive engine communicatively coupled to the other of, 1) a UAS C2 backhaul network and 2) a UAS C2 remote ground station not otherwise connected to the UAS C2 backhaul network, the UAS C2 backhaul network associated with one or more quality of service (QoS) parameters;
each cognitive engine configured to:
receive one or more packets from the other cognitive engine;
determine whether the one or more packets are test packets or C2 packets;
if the one or more packets are test packets:
determine one or more QoS parameters corresponding to the reception of the one or more packets;
and
transmit the one or more determined QoS parameters to the other cognitive engine via the one or more communications links; and
if the one or more packets are C2 packets:
identify the at least one coding scheme corresponding to the one or more packets;
and
decode the one or more packets according to the at least one identified coding scheme.

9. The adaptive extension apparatus of claim 8, wherein the one or more communications links include at least one of a wireless link and a physical link.

10. The adaptive extension apparatus of claim 8, wherein the at least one coding scheme includes at least one packet repetition coding scheme.

11. The adaptive extension apparatus of claim 8, wherein the at least one coding scheme includes at least one sliding window coding scheme.

12. The adaptive extension apparatus of claim 8, wherein the at least one coding scheme includes at least one packet erasure coding scheme.

13. The adaptive extension apparatus of claim 8, wherein the one or more QoS parameters include at least one of a packet loss ratio and a packet delay.

14. A method for adaptive extension of an unmanned aircraft system (UAS) command and control (C2) backhaul network, the method comprising:
transmitting, via a front-end cognitive engine, one or more test packets to a back-end cognitive engine via one or more communications links, the front-end cognitive engine communicatively coupled to one of, and the back-end cognitive engine communicatively coupled to the other of, a C2 backhaul network and at least one C2 remote ground station not otherwise connected to the C2 backhaul network across a backhaul network extension;
receiving, via the front-end cognitive engine, feedback based on the transmitting from the back-end cognitive engine via the one or more communications links, the feedback associated with one or more quality of service (QoS) parameters;
based on the received feedback, adjusting, via the front-end cognitive engine, at least one coding scheme associated with the transmission of one or more C2 packets via the one or more communications links;
receiving, via the front-end cognitive engine, the one or more C2 packets from at least one of the C2 backhaul network or the at least one C2 remote ground station;
identifying, via the front-end cognitive engine, at least one packet size associated with the one or more C2 packets;
selecting, via the front-end cognitive engine, at least one coding scheme based on the identified packet size;
encoding, via the front-end cognitive engine, the one or more C2 packets based on the selected coding scheme;
transmitting, via the front-end cognitive engine, the one or more encoded C2 packets to the back-end cognitive engine via the one or more communications links;
receiving, via the front-end cognitive engine, one or more back-end packets from the back-end cognitive engine;
determining whether the one or more back-end packets are test packets or C2 packets associated with a C2 message;
if the one or more back-end packets are test packets, 1) determining one or more QoS parameters corresponding to the reception of the one or more back-end packets and 2) transmitting the one or more determined QoS parameters to the back-end cognitive engine via the one or more communications links; and if the one or more packets are C2 packets, 1) identifying the at least one coding scheme corresponding to the one or more back-end packets and 2) decoding the one or more back-end packets according to the at least one identified coding scheme.

\* \* \* \* \*